United States Patent
Song et al.

(10) Patent No.: US 11,180,666 B2
(45) Date of Patent: Nov. 23, 2021

(54) INTUMESCENT COATING SYSTEM

(71) Applicant: DDP SPECIALTY ELECTRONIC MATERIALS US, LLC, Wilmington, DE (US)

(72) Inventors: Xiaomei Song, Shanghai (CN); Dakai Ren, Midland, MI (US); Hongyu Chen, Shanghai (CN); Yi Zhang, Shanghai (CN)

(73) Assignee: DDP SPECIALTY ELECTRONIC MATERIALS US, LLC, Wilmington, DE (US)

( * ) Notice: Subject to any disclaimer, the term of this patent is extended or adjusted under 35 U.S.C. 154(b) by 232 days.

(21) Appl. No.: 16/490,617

(22) PCT Filed: Mar. 14, 2017

(86) PCT No.: PCT/CN2017/076588
§ 371 (c)(1),
(2) Date: Sep. 3, 2019

(87) PCT Pub. No.: WO2018/165844
PCT Pub. Date: Sep. 20, 2018

(65) Prior Publication Data
US 2020/0002552 A1    Jan. 2, 2020

(51) Int. Cl.
| | | |
|---|---|---|
| *C09D 5/18* | (2006.01) | |
| *C08G 18/40* | (2006.01) | |
| *C08G 18/42* | (2006.01) | |
| *C08G 18/44* | (2006.01) | |
| *C08G 18/54* | (2006.01) | |
| *C08G 18/76* | (2006.01) | |
| *C08J 9/36* | (2006.01) | |
| *C08K 3/04* | (2006.01) | |
| *C08K 3/38* | (2006.01) | |
| *C09D 175/04* | (2006.01) | |
| *C09D 175/06* | (2006.01) | |

(52) U.S. Cl.
CPC ......... *C09D 5/185* (2013.01); *C08G 18/4027* (2013.01); *C08G 18/4202* (2013.01); *C08G 18/4211* (2013.01); *C08G 18/44* (2013.01); *C08G 18/542* (2013.01); *C08G 18/7671* (2013.01); *C08J 9/365* (2013.01); *C08K 3/04* (2013.01); *C08K 3/38* (2013.01); *C09D 175/04* (2013.01); *C09D 175/06* (2013.01); *C08J 2475/04* (2013.01); *C08J 2475/06* (2013.01); *C08K 2003/387* (2013.01)

(58) Field of Classification Search
CPC ........ C08G 71/00; C08G 71/02; C08G 71/04; C09D 7/40; C09D 7/41; C09D 7/42; C09D 7/43; C09D 7/44; C09D 7/45; C09D 7/48; C09D 7/60; C09D 7/61; C09D 7/62; C09D 175/00; C09D 175/02; C09D 175/04; C09D 175/06; C09D 175/08; C09D 175/10; C09D 175/12; C09D 175/14; C09D 175/16; C09D 5/18; C09D 5/185; C08K 3/32; C08K 2003/321; C08K 2003/322; C08K 2003/323; C08K 2003/324; C08K 2003/325; C08K 2003/326; C08K 2003/327; C08K 2003/328; C08K 2003/329; C08K 3/042

See application file for complete search history.

(56) References Cited

U.S. PATENT DOCUMENTS

| | | | |
|---|---|---|---|
| 4,139,501 A | 2/1979 | Rudner et al. | |
| 4,147,678 A | 4/1979 | Mao et al. | |
| 4,338,412 A | 7/1982 | von Bonin | |
| 4,367,295 A | 1/1983 | von Bonin | |
| 5,968,669 A | 10/1999 | Liu et al. | |
| 9,097,011 B1 | 8/2015 | Barone et al. | |
| 2015/0020476 A1 | 1/2015 | Winterowd et al. | |
| 2016/0083593 A1* | 3/2016 | Marauska ............ | C08G 18/792 521/163 |
| 2016/0152841 A1* | 6/2016 | Butler .................. | C09D 163/00 428/446 |
| 2016/0222226 A1 | 8/2016 | Priemen et al. | |

FOREIGN PATENT DOCUMENTS

| | | |
|---|---|---|
| CN | 102664484 A | 9/2012 |
| CN | 105358633 A | 2/2016 |
| CN | 105637041 A | 6/2016 |
| CN | 106243335 A | 12/2016 |
| JP | 2011252058 A | 12/2011 |
| WO | 0166669 A2 | 9/2001 |
| WO | 2012076905 A1 | 6/2012 |
| WO | 2015052148 A1 | 4/2015 |

OTHER PUBLICATIONS

PCT International Search Report, dated Dec. 8, 2017, for International Application No. PCT/CN2017/076588, filed Mar. 11, 2017, ISA/CN, Dec. 4, 2017, MA, Zhenpeng.

* cited by examiner

*Primary Examiner* — Christopher M Rodd

(57) ABSTRACT

An intumescent coating system contains: a polyol component; an isocyanate component; a latent crosslinker having two or more —NACH$_2$OR groups, where A is selected from a group consisting of H and —CH$_2$OR, and in each case R is independently selected from a group consisting of hydrocarbons having from one to four carbons, the latent crosslinker being present at a concentration of 30 weight-percent or more based on polyol weight; a boron component one weight-percent or more and 10 weight-percent or less based on total weight of the formulation; and expandable graphite at a concentration of 10 weight-percent or more and 50 weight-percent or less based on the total intumescent system weight; where the polyol and isocyanate are selected so that the reaction product at room temperature of the intumescent coating system components produces a coating having a tensile elongation of 40-percent or more as determined according to ISO 37.

10 Claims, 2 Drawing Sheets

INTUMESCENT COATING SYSTEM

BACKGROUND OF THE INVENTION

Field of the Invention

The present invention relates to an intumescent coating system containing a polyol component, an isocyanate component, a latent crosslinker, a boron component and expandable graphite

Introduction

Intumescent coatings serve to increase the fire resistance of a substrate on which the coating resides. Intumescent coatings provide fire protection by expanding to produce an insulating layer of char over a substrate when exposed to heat. For the intumescent coating to be effective, the insulating layer of char needs to have enough strength (integrity) to remain in place and provide sufficient insulating effect to protect the substrate it is coating from damage resulting from exposure to high temperatures.

Intumescent coatings have been used on building and construction components. For example, U.S. Provisional Patent Application Ser. No. 62/288,474 describes an intumescent coating for use on polymeric foam boards in vertical wall applications. The goal of that coating is to enable polymeric foam boards to maintain a temperature on the back of the board substrate over which the coating resides of 400 degrees Celsius (° C.) or less for 30 minutes in a modified cone calorimetry test that models NFPA 285 full wall fire testing results. The modified cone calorimetry test uses a heating rate of approximately 17° C. per minute.

Intumescent coatings are also used on I-joists of building structures. Generally, intumescent coatings are used to protect metal I-joist in commercial structures. However, it is also desirable to use intumescent coatings on wooden I-joists in residential structures. A challenge in protecting wooden I-joists is that the fire test used to qualify I-joists exposes the intumescent coating directly to a heat source, thereby inducing a much faster heating rate of the intumescent coating than experienced by an intumescent coating in the vertical wall structure testing. In the vertical wall structure testing, the intumescent coating is sandwiched between cladding and foam, so it does not experience direct exposure to a heat source unless or until the cladding is burned through. The intumescent coating experiences a heating rate of approximately 17° C. per minute in the vertical wall structure test but a heating rate of 50° C. per minute during the ASTM E119 I-joist test. The faster heating rate used in I-joist testing creates technical challenges for the intumescent coating's ability to protect the substrate over which it resides not present in the vertical wall structure testing. Comparative Examples A and B herein reveal how an intumescent coating of U.S. Provisional Patent Application Ser. No. 62/288,474 can protect a substrate under the slower heating rate of NFPA 285 heating rate, but fails to protect the substrate under a heating rate of approximately 30° C. per minute.

In order to protect substrates such as wood and polymers it is necessary to use an intumescent material that has an activation temperature that is relatively low compared to intumescents for protecting metal substrates. The reason is that wood and polymer substrates are damaged at lower temperatures than metal substrates so intumescence must occur at a lower temperature for wood and polymer substrates. For that reason, expandable graphite is a desirable intumescent for wood and polymer substrates.

Expandable graphite is known in the art as a possible intumescent that has activation temperatures below 250° C., even below 200° C. However, expandable graphite is also known to induce a "popcorn effect" in intumescent coatings wherein the expansion of the graphite causes the intumescent coating to flake off from the substrate resulting in poor protection of the substrate it is supposed to protect. The popcorn effect is worsened when expandable graphite is used as the primary intumescent in a coating. Strengthening the binder in a coating by, for example, crosslinking the binder, can help inhibit the popcorn effect during intumescence, but that typically results in a rigid coating that lacks durability during handling and even in building applications where yielding of the coating to accommodate movement of the substrate is desirable.

Intumescent coatings often degrade when exposed to moisture. Moisture causes hydrophilic components in the coatings to lose mechanical properties and fire protection performance. As a result, intumescent coatings are generally not suited for exterior exposure due to their lack of water resistance. Nonetheless, there are situations where building materials may sit exposed to outside elements, including moisture, for periods of time during a construction project. Therefore, it would be desirable if building materials, such as I-joists, could have a water resistant intumescent coating so the coating would not degrade if exposed to moisture. However, to qualify as a "water resistant barrier" the coating will need to demonstrate water resistance under ASTM D870 testing. Intumescent coatings are not known to be water resistant so this is a challenging hurdle.

It is desirable and would advance the art of building and construction to identify an intumescent coating system that is capable of providing a 1-2 millimeter thick intumescent coating on a substrate which will protect that substrate during an increase in temperature of approximately 30° C. or more per minute by maintaining a temperature behind the substrate at a temperature of 150° C. or less after 15 minutes and 300° C. or less after 30 minutes of exposure to the heat source. At the same time, it is desirable for the system to provide an intumescent coating that is yielding prior to intumescing to provide integrity to the coating during thermal expansion and contraction of building elements in normal usage. As used herein, "yielding" means having an elongation at 23° C. of 35% or more, preferably 40% or more, more preferably 45% or more and most preferably 50% or more when testing according to ISO 37.

BRIEF SUMMARY OF THE INVENTION

The present invention provides an intumescent coating system that is capable of providing a 1-2 millimeter thick intumescent coating on a substrate which will protect that substrate during an increase in temperature of approximately 30° C. or more per minute by maintaining a temperature behind the substrate at a temperature of 150° C. or less after 15 minutes and 300° C. or less after 30 minutes of exposure to the heat source. At the same time, it the intumescent coating system provides an intumescent coating that is yielding prior to intumescing to provide integrity to the coating during thermal expansion and contraction of building elements in normal usage. As used herein, "yielding" means having an elongation at 23° C. of 35% or more, preferably 40% or more, more preferably 45% or more and most preferably 50% or more when testing according to ISO 37. The intumescent coating system can further provide an intumescent coating that is water resistant according to ASTM D870, halogen-free, or both water resistant according to ASTM D870 and halogen-free. Moreover, the intumescent system uses expandable graphite as a primary intumescent.

A previous invention has provided an intumescent coating suitable for use on polymeric foam board substrate that protects the foam board substrate from elevated temperatures in a modified cone calorimetry test (see, U.S. Provisional Patent Application Ser. No. 62/288,474). The modified cone calorimetry test is a desirable test because it creates a substrate surface temperature profile similar to that of a complex full wall assembly test of NFPA 285, but without the cost of a full NFPA 285 test. However, such a test subjects an article to a relatively slow heating rate of approximately 17° C. per minute and while the intumescent coating of the previous invention protects a substrate during such a heating rate it has been shown to be less effective at protecting a substrate from heat during a more rapid heating rate of approximately 30° C. per minute (see Comparative Examples A and B herein). The present invention provides a meaningful advancement over this prior coating. It is important to advance performance of the previous coating to protect at faster heating rates to develop an intumescent coating for wooden and even polymeric substrates that are more likely to pass the ASTM E119 testing required of I-joist materials.

Surprisingly, the present invention has achieved the stated performance and protection at the faster heating rate by utilizing a polyurethane binder in combination with a component with two or more —$NACH_2OR$ groups that serves as a latent crosslinker for the polyurethane binder. "A" is selected from a group consisting of H and —$CH_2OR$ and each "R" is independently a hydrocarbon having from one to six carbons. The latent crosslinker reacts with the polyurethane at elevated temperatures proximate to the intumescent temperature so as to provide binder strength during intumescence. As a result, the coating remains yielding at normal use temperatures but becomes more rigid through crosslinking during intumescence in a fire situation. The benefit is that the graphite intumescent can expand the normally yielding binder during intumescence but avoiding the popcorn effect that damages the resulting char because the binder crosslinks at the elevated temperature as the coating intumesces.

In a first aspect, the present invention is an intumescent coating system comprising (a) a polyol component; (b) an isocyanate component; (c) a latent crosslinker having two or more —$NACH_2OR$ groups, where A is selected from a group consisting of H and —$CH_2OR$, and in each case R is independently selected from a group consisting of hydrocarbons having from one to four carbons, the latent crosslinker being present at a concentration of 30 weight-percent or more based on polyol weight; (d) a boron component one weight-percent or more and 10 weight-percent or less based on total weight of the formulation; and (e) expandable graphite at a concentration of 10 weight-percent or more and 50 weight-percent or less based on the total intumescent system weight; where the polyol and isocyanate are selected so that the reaction product at room temperature of the intumescent coating system components produces a coating having a tensile elongation of 40-percent or more as determined according to ISO 37.

In a second aspect, the present invention is an intumescent coating comprising the reaction product of the components of the first aspect of the present invention.

In a third aspect, the present invention is an article comprising a substrate and the intumescent coating of the second aspect of the present invention covering at least a portion of the surface of the substrate.

The present invention is useful as a flame retarding coating on organic substrates such as, for example, wood substrates and plastic foam substrates.

DETAILED DESCRIPTION OF THE INVENTION

Figure 1:
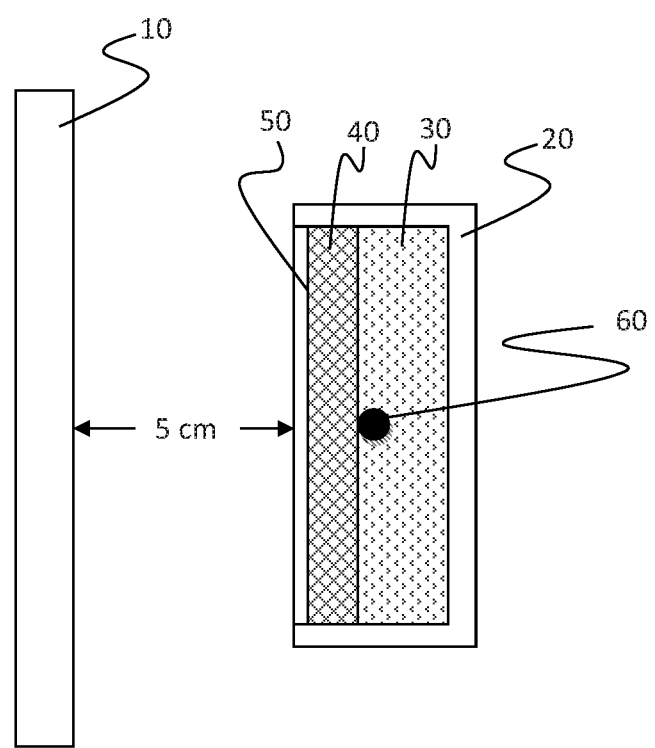
FIG. 1 provides a schematic drawing of the Radiant Panel Test configuration.

"And/or" means "and, or alternatively". Ranges include endpoints unless otherwise stated.

Test methods refer to the most recent test method as of the priority date of this document unless a date is indicated with the test method number as a hyphenated two digit number. References to test methods contain both a reference to the testing society and the test method number. Test method organizations are referenced by one of the following abbreviations: ASTM refers to ASTM International (formerly known as American Society for Testing and Materials); EN refers to European Norm; DIN refers to Deutsches Institut für Normung; and ISO refers to International Organization for Standardization. NFPA refers to National Fire Protection Association.

The intumescent coating system of the present invention comprises components that can be combined to form an intumescent coating. The components of the intumescent coating system can be combined and coated onto at least a portion of a surface of a substrate in order to create an intumescent coating on the surface the substrate.

The intumescent coating system of the present invention comprises: (a) a polyol component; (b) an isocyanate component; (c) a latent crosslinker; (d) a boron component; and (e) expandable graphite.

The Polyol Component

The polyol component is one or more than one polyol. A "polyol" is a compound containing multiple hydroxyl (—OH) groups. Polyols can be polymeric (that is, polymeric polyols) or not polymeric.

Desirably, the polyol component comprises or consists of one or more than one polyol selected from a group consisting of polyester polyols, polyether polyols, polycarbonate polyols, Novolac polyols and combinations thereof. Suitable polyester and polyether polyols can be aliphatic, aromatic, or combinations of aliphatic and aromatic polyols. Desirably, the polyol in the polyol component includes or consists of one or more than one aromatic polyester polyol.

Suitable polyester polyols can be produced, for example, from aliphatic organic dicarboxylic acids with 2 to 12 carbons, preferably aliphatic dicarboxylic acids with 4 to 6 carbons, and multivalent alcohols, preferably diols, with 2 to 12 carbons. Examples of aliphatic dicarboxylic acids include succinic acid, glutaric acid, adipic acid, suberic acid, azelaic acid, sebacic acid, decanedicarboxylic acid, maleic acid, and fumaric acid. The corresponding dicarboxylic acid derivatives may also be used such as dicarboxylic acid mono- or di-esters of alcohols with 1 to 4 carbons, or dicarboxylic acid anhydrides. Examples of divalent and multivalent alcohols, especially diols, include ethanediol, diethylene glycol, glycerine and trimethylolpropanes or mixtures of at least two of these diols.

Useful aromatic polyols include aromatic polyether polyol, aromatic polyester polyol or combinations of the two. Particularly desirably aromatic polyester polyol is an aromatic dicarboxylic acid with 8 to 24 carbons. While the aromatic polyester polyols can be prepared from substantially pure aromatic dicarboxylic acids, more complex ingredients are advantageously used, such as the side stream, waste or scrap residues from the manufacture of phthalic acid, terephthalic acid, dimethyl terephthalate, and polyethylene terephthalate. Other residues are dimethyl terephthalate (DMT) process residues, which are waste or scrap residues from the manufacture of DMT.

Examples of suitable polyols include polycarbonate diols such as those sold under the tradenames P100 (UBE Corporation), Novolac polyols such as those sold under the name NX-9001LV and GX9201, which are based on cashew nutshell liquid technology, from Cardolite company. Examples of suitable polyester polyols include those available as PS2412 and PS1752 from Stepan Company.

The polyols suitable for use in the present invention desirably have a glass transition temperature (Tg) of 25° C. or less, preferably 0° C. or less and can have a Tg of −10° C. or less, −30° C. or less and even −50° C. or less and at the same time typically has a Tg of −80° C. or higher. Determine Tg of the polyol according to ASTM D7426-08.

The polyol is desirably present at a concentration of 20 wt % or more, preferably 30 wt % or more and more preferably 35 wt % and at the same time desirably 80 wt % or less, preferably 70 wt % or less and more preferably 65 wt % or less based on total weight of the intumescent coating system.

Desirably, the polyol is present at a concentration of 50 weight-percent (wt %) or more and at the same time is desirably present at a concentration of 90 wt % or less, with wt % based on total combined weight of polyol and isocyanate component.

The Isocyanate Component

The isocyanate component is one or more than one isocyanate-containing compound that contains at least two, and can contain at least three isocyanate functionalities per molecule. The isocyanate-containing compound can be any one or combination of more than one isocyanate-containing compound used to prepare thermoset polyurethane foam. Suitable isocyanate-containing compounds include: aliphatic polyisocyanates, cylcoaliphatic isocyanates, aromatic polyisocyanates and any combinations thereof. A crude polyisocyanate may also be used in the practice of this invention, such as crude toluene diisocyanate obtained by the phosgenation of a mixture of toluene diamine or the crude diphenylmethane diisocyanate obtained by the phosgenation of crude methylene diphenylamine. Preferred polyisocyanates are aromatic polyisocyanates such as disclosed in U.S. Pat. No. 3,215,652. Especially preferred are methylene-bridged polyphenyl polyisocyanates and mixtures thereof with crude diphenylmethane diisocyanate, due to their ability to cross-link the polyurethane. Desirably, the isocyanate-containing compound includes or is polymeric methylene diphenyl diisocyanate (polymeric MDI).

The isocyanate-containing compound or compounds desirably have an average functionality of 2 or more. At the same time, it is desirable for the isocyanate-containing compound to have an average functionality of 2.7 or less, and can be 2.5 or less.

Preferably, the isocyanate-containing compound is any one or any combination of more than one component selected from a group consisting of methylene diphenyl diisocyanate, polymeric methylene diphenyl diisocyanate, toluene diisocyanate, isophorone diisocyanate, and xylene diisocyanate.

The isocyanate-containing compound and one or more than one polyol in the polyol component react to form a polyurethane binder upon mixing at a temperature of 50 degrees Celsius (° C.) or lower, preferably 40° C. or lower, more preferably 30° C. or lower and can react to form a polyurethane binder upon mixing at a temperature of 25° C. or lower, 23° C. or lower or even 20° C. or lower. Technically, the present invention does not require a lower limit on the temperature at which the reaction to form a polyurethane binder occurs but generally the reaction occurs at temperatures of 5° C. or higher.

The molar ratio of isocyanate-containing compound and polyol is such that there is an excess of isocyanate reactive groups relative to hydroxyl groups on the polyol. As such, once the polyurethane binder forms there are still isocyanate groups available to later react with the latent crosslinker when the binder is heated in a fire-condition. This is a critical aspect of the present invention. The polyurethane binder remains relatively flexible until the latent crosslinker triggers further crosslinking of the polyurethane during a fire situation. Prior to the latent crosslinker triggering further reaction with the isocyanate functionalities the polyurethane binder and intumescent coating as a whole remains sufficiently flexible to maintain integrity even though the substrate or substrates it coats undergoes slight motions (for example, thermal expansion and contraction). Likewise, the binder remains flexible enough to allow expansion of the intumescent material early in a fire situation without loss of integrity through the popcorn effect. Yet, when placed in a hot fire condition the latent crosslinker reacts with the remaining isocyanate functionalities and can react with isocyanate functionalities that de-associate from polyurethane resin during degradation at the elevated temperature of a hot fire condition rendering the coating rigid enough to hold the expanded binder together and give the resulting char strength to protect the substrate over which the coating resides.

The ratio of isocyanate functionalities to —OH functionalities to isocyanate functionalities in the system is desirably 1.0 or more, preferably 1.1 or more and at the same time 3.0 or less, preferably 2.0 or less and more preferably 1.5 or less. Determine the isocyanate content according to ASTM D5155-14e1. Determine —OH content according to ASTM D4247-99.

Typically, the combination of polyol and isocyanate-containing components of the intumescent coating system is 20 weight-percent (wt %) or more, preferably 30 wt % or more and more preferably 35 wt % or more while at the same time is generally 80 wt % or less, preferably 70 wt % or less and more preferably 65 wt % or less of the total weight of the intumescent coating system weight.

The polyol component and isocyanate component are selected so that the reaction product of the intumescent coating system components at 23° C. produces a coating having a tensile elongation of 40 percent (%) or more and at the same time desirably 100% or less as determined according to ISO37. This tensile elongation is achieved when using a polyol that has a glass transition temperature of less than 25° C., preferably 23° C. or less and more preferably 20° C. or less and a maps percent polyol of 50 wt % or more and 90 wt % or less relative to combined weight of polyol and isocyanate component, and an isocyanate having an average functionality of 2.0 or more and 2.7 or less.

Examples of suitable combinations of polyol components and isocyanate components include 50/50 ortho/para methylene diphenyl diisocyanate blended with any one or combination of more than one polyol selected from copolycarbonate diol based on 1,5 and 1,6 hexanediol, liquid Novolac polyol based on cashew nutshell liquid technology, and phthalic anhydride-based aromatic polyester polyol.

The Latent Crosslinker

The intumescent coating system of the present invention includes a latent crosslinker. As used herein, "latent crosslinker" refers to a component that will react with isocyanate functionalities on the isocyanate-containing compound at a trigger temperature of 200° C. or higher, preferably 250° C. or higher and at the same time desirably at a temperature of 300° C. or lower, preferably 250° C. or lower. It is designated "latent" because the isocyanate-containing compound reacts with the polyol in a crosslinking reaction to form the polyurethane binder of the intumescent coating formed by the intumescent coating system at a lower temperature than the latent crosslinker so the latent crosslinker remains in the intumescent coating without crosslinking with the isocyanate-containing compound to a measureable extent (that is, an extent that measurably affects the tensile elongation properties of the intumescent coating) until the intumescent coating is exposed to a temperature at least as high as the trigger temperature.

Without being bound by theory, the latent crosslinking is expected to enable the intumescent coating to remain yielding as a coating on a substrate but become rigid when exposed to rapid heating conditions that would otherwise cause a yielding coating to flake off from a substrate due to popcorn effect behavior and fail to protect the substrate. Prior to the present invention, one must choose the benefits of a yielding coating or integrity of a rigid coating. The presence of the latent crosslinker in the present invention allows obtention of both properties in a single material—a yielding coating that crosslinks to a rigid material providing integrity of an intumescent char upon rapid heating, a char that thermally insulates the substrate over which it resides.

The latent crosslinker can have one functionality that reacts with an isocyanate functionality below the trigger temperature such that it becomes attached to the polyurethane binder at lower temperatures than the trigger temperature. In such a case, the latent crosslinker has at least one additional reactive group that reacts with an isocyanate functionality on the isocyanate-containing component only at or above the trigger temperature thereby crosslinking the polyurethane binder to a measurable extent only at or above the trigger temperature.

The latent crosslinker desirably has two or more —NACH$_2$OR groups, where A is selected from a group consisting of H and —CH$_2$OR and in each case R is independently selected from a group consisting of hydrocarbons having from one to four carbons. Desirably, R is independently selected from a group consisting of hydrocarbons having one or more, two or more, or three or more carbons while at the same time having four or fewer carbons and can have three or fewer or even two or fewer carbons.

Desirably, the latent crosslinker comprises or is one or any combination of more than one functionalized melamine compound having two or more —NACH$_2$OR groups as described above. For example, the latent crosslinker can be selected from compounds having the following structure:

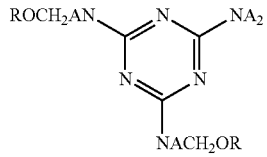

where each A and R is independently as described above for the NACH$_2$OR groups.

Examples of suitable latent crosslinkers include tris-(hydroxymethyl) melamine, tris-(hydroxymethyl)-tris-(methoxymethyl) melamine, hexa-(methoxymethyl) melamine, hexa-(hydroxymethyl) melamine, tetra-(n-butoxymethyl) melamine), and methoxy/n-butyoxy methylmelamine. Suitable latent crosslinkers are commercially available under the commercial trade names of Cymel™ 303, Cymel 1130 and Cymel 1125 (Cymel is a trademark of Allnex IP S.A.R. L. Societe a Responsabilite Limitee).

The latent crosslinker can be fully alkoxylated or partially alkoxylated. Desirably, the latent crosslinker is greater than 50%, more preferably 75% or more, even more preferably 80% or more, yet more preferably 90% or more and can be 100% (fully) alkoxylated. The extent of alkoxylation refers to the number percent of amine branches (designated by "CH$_2$OR" and "A" groups in the structures above) that contain an alkoxy group. Percent alkoxylation can be determined by nuclear magnetic resonance (NMR) spectrometry.

The latent crosslinker is present at a concentration of 30 weight-percent or more based on polyol weight. At the same time the latent crosslinker is desirably present at a concentration of 10 wt % or more, preferably 15 wt % or more and more preferably 20 wt % or more while at the same time is desirably present at a concentration of 40 wt % or less, preferably 35 wt % or less with wt % relative to total intumescent coating system weight.

The Boron Component

Boron components are common in intumescent systems and the boron component of the present invention can, in the broadest scope of the invention, be any one or combination of more than one boron component known for use in intumescent coating formulations and coatings. The boron component desirably has a sintering temperature of 400° C. or higher, and can be 450° C., even 550° C. or higher and is generally 600° C. or lower. Sintering temperature refers to the temperature at which grains of solid formed from powder start connecting through their boundaries and begin merging into a single material. The sintering temperature is 70-90% of the melting temperature of the material as determined by differential scanning calorimetry. Sintering of the boron component adds strength to the expanded coating char formed by the intumescent coating thereby reinforcing the insulating effect of the charred coating, and thereby increasing the thermal protection of the polymeric foam on which the coating resides. Examples of suitable boron components include any one or any combination of more than one material selected from a group consisting of ammonium pentaborate, melamine borate, zinc borate, boric acid, and boric oxide.

Desirably, the boron component is present at a concentration that provides boron at a concentration of one wt % or more, preferably two wt % or more, and can be three wt % or more, four wt % or more, five wt % or more, six wt % or more, seven wt % or more, eight wt % or more and even nine wt % or more while at the same time is generally ten wt % or less and can be nine wt % or less and even eight wt % or less with wt % based on total weight of intumescent coating formulation. Determine wt % of boron relative to total weight of intumescent coating system using X-ray fluorescence.

The Expandable Graphite

Expandable graphite serves as the primary, desirably essentially the only, and can be the only intumescent in the intumescent coating system. A "primary" intumescent accounts for more than 50% of the expansion of an intumescent coating prepared from the intumescent coating system. An intumescent that is "essentially the only" intumescent in the intumescent coating system accounts for 75% or more, preferably 80% or more, more preferably 90% or more and can account for 100% of the expansion of an intumescent coating prepared from the intumescent coating system.

The expandable graphite is present in the form of expandable graphite particles. The expandable graphite particles provide expansion of an intumescent coating formed by the intumescent coating system at a desirable onset temperature suitably low enough to expand an intumescent coating to protect substrates such as wood or polymeric foam over with the intumescent coating resides. Additionally, expandable graphite provides a desirable carbon-source for the coating.

Expandable graphite particles are graphite particles (also called "flake") that have been intercalated by exposure to acid. Expandable graphite expands when exposed to heat. The temperature at which expandable graphite begins to expand is the "onset: temperature (also known as the "critical" temperature or "activation" temperature) of the expandable graphite. Determine the onset temperature for expandable graphite by identifying what temperature is required to achieve 1% volume expansion as determined by thermal mechanical analysis (0.02 Newton normal force with a temperature ramping rate of 5° C. per minute). The expandable graphite of the present invention has an onset temperature of 200° C. or lower and generally has an onset temperature of 150° C. or higher.

It is important for the intumescent coating to expand at a temperature low enough to provide an insulating layer to protect the substrate over which the coating resides from an extent of heat that would melt or deteriorate in some other way the polymeric foam. If the onset temperature of the intumescent coating is too high, the substrate will deteriorate before the intumescent coating can protect it from damage. Therefore, the onset temperature of an intumescent coating must be matched to the type of material the intumescent coating protects. The onset temperature needed for wood and polymeric foam, for example, is significantly lower than the onset temperature needed for steel girders. Discovering the required onset temperature for wood and polymeric foam and what material could introduce such an onset temperature to an intumescent coating over the foam was part of the challenge of the present invention. Not all expandable graphite particles, for example, have the same onset temperature. Therefore, it is necessary to use an expandable graphite with a specific onset temperature in the intumescent coating of the present invention. It is also important that the expandable graphite be at least the primary, preferably the essentially only and most preferably the only intumescent in the intumescent coating system and intumescent coating formed by the intumescent coating system.

Expandable graphite particles are present in the intumescent coating at a concentration of 10 wt % or more, preferably 15 wt % or more and can be 20 wt % or more, 25 wt % or more 30 wt % or more, 35 wt % or more, 40 wt % or more and even 45 wt % or more while at the same time are typically present in the intumescent coating at a concentration of 50 wt % or less and can be 45 wt % or less or even 40 wt % or less with wt % relative to total weight of intumescent coating system. Determine wt % expandable graphite particles relative to total weight of intumescent coating system using a thermogravimetric analysis method (ASTM E1131).

Desirably, the expandable graphite particles have an average particle size of 0.07 millimeters (mm) or more, and can have an average particle size of 0.10 mm or more, 0.15 mm or more, 0.20 mm or more, 0.25 mm or more, 0.30 mm or more, 0.40 mm or more, even 0.50 mm or more and at the same time typically has an average particle size of 0.60 mm or less and can have an average particle size of 0.50 mm or less, 0.40 mm or less, 0.35 mm or less or even 0.30 mm or less. Determine average particle size of for the expandable graphite according to ASTM D1920-06.

Additional Optional Components

The intumescent coating system can optionally further comprise any one or any combination of more than one additional component. Examples of additional components that are suitable include any one or combination of more than one selected from a group consisting of phosphorous compounds, flame retardants, fillers dispersants, defoamers, colorants, catalysts useful for assisting the polyol/isocyanate reaction and any other component used in intumescent coating formulations that does not conflict with prior teachings herein (for example, intumescent components that serve as primary intumescent instead of expandable graphite).

Examples of suitable phosphorous compounds include any one or any combination of more than one component selected from a group consisting of ammonium phosphate type I, ammonium phosphate type II; melamine formaldehyde resin modified ammonium polyphosphate; silane modified ammonium polyphosphate; melamine polyphosphate; bisphenol A; bis(diphenyl phosphate); cresyldiphenyl phosphate; dimethylpropane phosphonate; polyphosphonates; metal phosphinate; phosphorous polyol; phenyl phospholane; polymeric diphenyl phosphate; resorcinol-bis-diphenylphosphate; triethyl phosphate, tricresyl phosphate; triphenyl phosphate, and ammonium phosphate.

Examples of suitable flame retardants include any one or any combination or more than one component selected from a group consisting of boehmite, aluminum hydroxide, magnesium hydroxide, antimony trioxide, as well as halogenated compounds including halogenated polymers. Desirably, the present invention is free of halogenated flame retardants and more preferably free of any halogenated materials.

Examples of typical fillers include silicon dioxide, zinc oxide, titanium oxide, talk, montmorillonite clay, and china clay.

Examples of typical catalysts include tertiary amines and organometallic catalysts. Examples of suitable tertiary amines include trimethylamine; triethylenediamine; bis(2-dimethylamineo-ethyl) ether; N,N-dimethylcyclohexylamine; N,N,N',N',N"-pentamethyldiethylenetriamine; 2(2-dimethylaminoethoxy) ethanol; dimethylethanolamine; and N-ethylmorpholine. Examples of organometallic catalysts include dibutyltin dilaurate; stannous octoate; potassium acetate; potassium octoate; dibutyltin mercaptide; dibutyltin thiocarboxylates; dibutyltin thiocarboxylates; dimethyltin dineodecanoate; dioctyltin dineodecanoate; and dimethyltin dioleate.

The intumescent coating system of the present invention is typically in a form that maintains separation of the polyol component from the isocyanate component until the system is applied to a substrate to form an intumescent coating. Once the polyol component and the isocyanate component are mixed they will react to form a polyurethane binder for the resulting intumescent coating that holds together the other components of the intumescent system.

Hence, mixing together the components of the intumescent coating system forms an intumescent coating that comprises the reaction product of the components of the intumescent coating system. The reaction products include the polyurethane binder formed by the reaction of the polyol and isocyanate components. The components other than the polyol and isocyanate components can be non-reacted and reside in the resulting intumescent coating physically bound in the polyurethane binder. Alternatively, one or more of the components may be reactive and also react upon mixing the components of the intumescent coating system together. For example, the latent crosslinker can react with the isocyanate component and/or the polyol component upon mixing of the intumescent coating system components and thereby become bound to the polyurethane binder provided one or more —NACH$_2$OR functionality on the latent crosslinker moiety remains unbound until triggered to latently crosslink the coating at the trigger temperature of the latent crosslinker.

Generally, the components of the intumescent coating system are provided in two or more containers (keeping the polyol and isocyanate components separate) and then mixed just prior to or as they are applied to a substrate in order to form an intumescent coating on the substrate. Often, the system is packaged or provided in a two-part system having an "A-Side" containing the isocyanate containing component and a "B-Side" containing the polyol and where the remaining components are included in one or both of the A-Side and B-Side. When preparing an intumescent coating the A-Side and B-Side are mixed and applied to a substrate. The resulting article comprises the substrate with an intumescent coating covering at least a portion of a surface of the substrate where the intumescent coating is the reaction product of the intumescent coating formed by the reaction product of the intumescent coating system. The intumescent system of the present invention is particular useful for applying intumescent coatings on substrates with relatively low tolerance for heat because the intumescing effect of expanded graphite occurs at a relatively low temperature compared to typical intumescent coatings. Hence, the intumescent coating system is particularly useful for applying to substrates that comprise one or a combination of more than one component selected from a group consisting of polymeric foam, wood, and plastic materials.

The resulting intumescent coating has a tensile elongation of 40% or more as determined according to ISO37 until exposed to a trigger temperature for the intumescent and latent crosslinker as would be experienced under fire conditions. Upon exposure to the trigger temperature for the intumescent and latent crosslinker the intumescent coating expands and forms a rigid crosslinked char that protects the substrate over which it resides, even when exposed to heating rates of 30° C. or more per minute.

EXAMPLES

Radiant Panel Test

Test the efficacy of an intumescent coating using the following Radiant Panel Test.

Prepare test samples by applying a 1.5 millimeter thick intumescent coating for each intumescent coating system on the primary surface of a one cm thick oriented strand board (OSB) substrate. Cut the test samples into squares 10 cm by 10 cm. Assemble the squares into a holder with the intumescent coating facing out and exposed and the opposing primary surface of the OSB placed against a ceramic plate with a thermocouple contacting the OSB between the OSB and ceramic plate. Hold the components together in a stainless steel sample holder. Place the sample holder next to a radiation panel so that the radiation panel is 5 cm away from the exposed intumescent coating as shown in FIG. 1. For reference, FIG. 1 generally illustrates the position of radiation panel 10, stainless steel sample holder 20, ceramic plate 30, OSB substrate 40, intumescent coating 50 and thermocouple 60. Radiation panel 10 is radiant panel model TDWYL-2 available from TaiDing Hengye Testing Instrument Co., LTD, Cangzhou, China. During the vertical radiation test, the radiation panel and test samples are arranged vertically and the radiation panel emits heat flux at the intumescent coating at 25 kilowatts per square meter. The temperature from the thermocouple between the OSB and ceramic plate is recorded and that temperature at 15 minutes and 30 minutes is noted.

Figure 2:
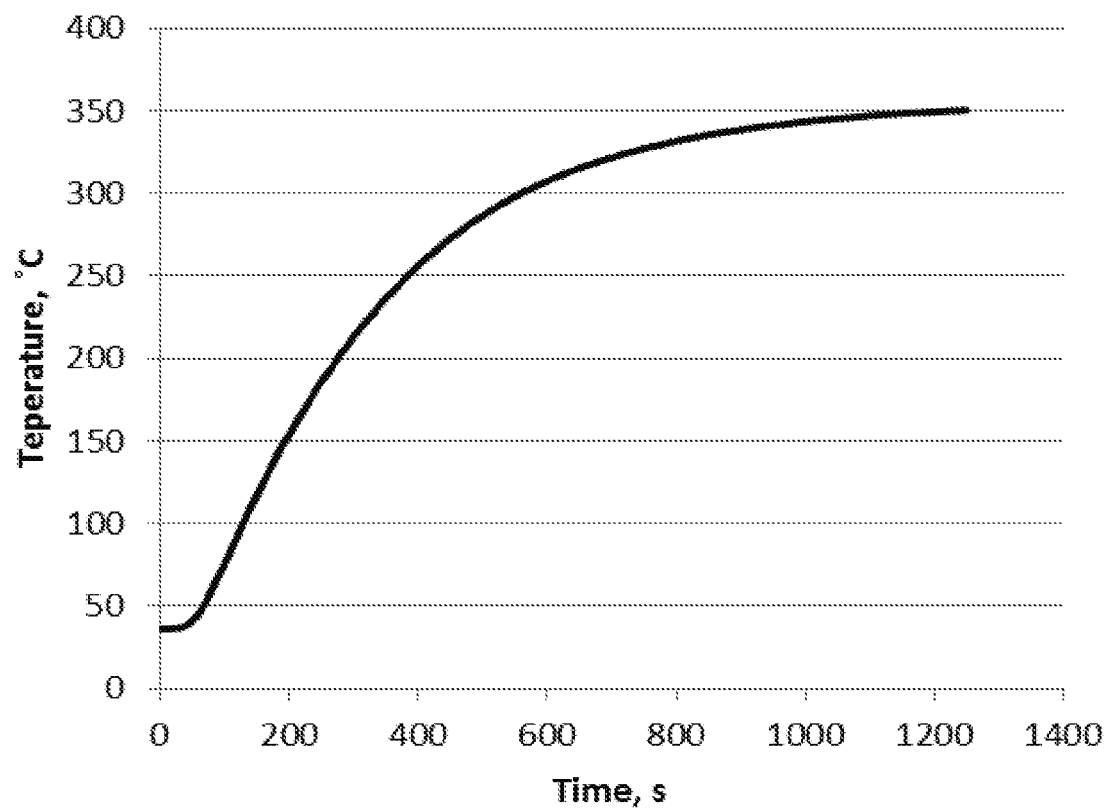
FIG. 2 provides a temperature profile of the Radiant Panel Test configuration taken in the space between the radiation panel 10 and intumescent coating 50 as a function of time.

FIG. 2 provides a heating curve for the Radiant Panel Test by showing the temperature between the heat source and the coating as a function of time during the test. The Radiant Panel Test provides a temperature rise profile that is approximately 30° C. per minute over the critical temperature range of 100° C. to 400° C. The range of 100-400° C. is most important because intumescence occurs at about 160° C. and OSB ignition occurs about 250-300° C. Therefore, this covers the critical temperatures of the components being tested.

Comparison of Test Methods—Effect of Rapid Heating in Radiant Panel Test

Comparative Examples A and B correspond to Examples 7 and 8 respectively from U.S. Provisional Patent Application Ser. No. 62/288,474. Table 1 provides the substrate temperature on the backside of the oriented strandboard substrate (side opposite of the intumescent coating as shown for the sample in FIG. 1) for these samples as tested according to the modified cone test of U.S. Provisional Patent Application Ser. No. 62/288,474 and also according to ASTM E119, which utilizes a much more rapid heating of the sample. Temperatures are measured on the back surface of substrate as shown in FIG. 1.

TABLE 1

| Sample | Comp Ex A | Comp Ex B |
|---|---|---|
| Modified Cone Calorimetry | | |
| 15 minute temp (° C.) | 190 | 190 |
| 25 min temp (° C.) | 300 | 300 |

TABLE 1-continued

| Sample | Comp Ex A | Comp Ex B |
|---|---|---|
| Radiant Panel Test | | |
| 15 min temp (° C.) | 300 | 220 |
| 25 min temp (° C.) | [substrate ignited] | 450 |

The data in Table 1 reveals the performance difference resulting from the difference in heating between the two tests. Substrate backside surface temperatures rise much more rapidly when tested according to the Radiant Panel Test, revealing that it is a much more difficult test for insulating a substrate.

New Examples and Comparative Examples

Table 2 identifies components for use in Comparative Example (Comp Ex) C and Examples (Exs) 1-6.

Table 3 identifies the materials making up the compositions for intumescent coating systems of Comp Ex C and Exs 1-6. Values for the materials are stated in relative weight parts. Prepare the intumescent coating systems into two components:
- "B" side component contains the polyol(s), the catalyst and the latent crosslinker.
- "A" side component contains all of the remaining materials of the system.

Prepare intumescent coatings from the intumescent coating systems by blending the A and B side components together at 1500 revolutions per minute using a high dispersing blade in a 150 milliliter plastic beaker for three minutes and then apply the resulting mixture to a substrate as described for each characterization method below. Draw a coating onto a substrate using a thin film blade with adjustable gap to control coating thickness and allow to polymerize at 25° C. for three days to form an intumescent coating on the substrate.

Characterize the intumescent coatings formed from each intumescent coating system with the following characterizations:

Tensile Elongation and Modulus. Measure Tensile Elongation and Modulus for each coating according to ISO37 Obtain a coating apart from a substrate for tensile elongation and modulus testing by applying a coating on release paper and removing after it is fully cured. Cut the coating into dumbbell pieces according to ISO 37. Use Type 2 dies and coating samples with a 75 millimeter overall length and one millimeter thickness. Use a pull speed of 50 millimeters per minute.

Water Resistance. Measure water resistance for each coating using the following modified ASTM D870 method. Obtain a test sample by preparing an intumescent coating on the primary surface of a 10 centimeters (cm) by 10 cm by 2.5 cm ceramic substrate to obtain a 1.5 mm thick (final thickness) coating. Allow the coating to set for five days. Weigh the test sample for a pre-test weight. Place the test sample under water at 23° C. for 24 hours. Remove the test sample from the water and remove surface water with a towel. Place the test sample in a freezer at −20° C. for 24 hours. Remove the test sample from the freezer and weight for a post-test weight. Rate the appearance of the coating on the test sample using the following scale: 5—excellent, no swelling, blistering or delamination; 4—good, a little swelled, no blistering or delamination; 3—fair, minor delamination; 2—bad, minor blistering or delamination; 1—fail, blistering or delaminated from the substrate. A score of 4 or 5 qualifies as "water resistant". Herein, a "primary surface" of an object is a surface having the greatest planar surface area of the object. "Planar surface area" is the surface area as projected onto a plane so as to avoid accounting for surface contours. An object can have more than one primary surface, such as a board that has opposing primary surfaces.

Expansion Ratio. Determine Expansion Ratio by measuring the intumescent coating thickness before and after conducting the Radiant Panel Test. Expansion ratio is the ratio of final thickness to initial thickness of the coating.

Char Strength Evaluation. Qualitatively assess char strength by visual observation and physical assessment of the char structure resulting from the Radiant Panel Test. Rank the char strength using the following scale: 1—very fluffy, poor cohesion and integrity, unable to withstand physical handling; 3—good cohesion and integrity, maintains physical integrity after physical handling; 5—very good cohesion and integrity, can withstand moderate physical compression.

Table 4 provides characterization results for intumescent coatings prepared from intumescent coating systems Comp Ex C and Exs 1-5.

Examples 1-4 illustrate intumescent systems having similar composition to Comp Ex C except each of Exs 1-4 also contains a latent crosslinker. Comparing the characterization results in Table 4 it is evident that inclusion of the latent crosslinker resulted in a much lower temperature behind the OSB during the Vertical Radiation Test—evidence that the latent crosslinker caused the resulting char of the intumescent coating to better thermally insulate the substrate under the intumescent coating during the rapid heating of the Vertical Radiation Test than a similar intumescent coating without the latent crosslinker. Exs 1-3 demonstrate this improvement with three different latent crosslinkers.

Ex 5 is similar to Example 1 except Ex 5 does not include the phosphorous material. Both intumescent systems perform similarly, and both provide significantly better insulating effect than Comp Ex C. Therefore, it is evident that the phosphorous material is optional.

Ex 6 provides an intumescent coating system with different polyols that Exs 1-5 and with a higher percentage of latent crosslinker relative to polyol. Ex 6 produces an intumescent coating that provides even greater thermal insulating properties than Exs 1-5.

TABLE 2

| Component | Description |
|---|---|
| Isocyanate 1 | Ortho-Para methylene diphenyl diisocyanate (MDI) with a functionality of 2.0, equivalent weight of 125.5 and 33.5 wt % "-NCO" functionality. The material is 50% 4,4-diphenylmethane diisocyanate and 50% 2,4-diphenylmethane diisocyanate. It is commercially available as ISONATE ™ 50 O,P' brand MDI. ISONATE is a trademark of The Dow Chemical Company. |
| Polyol 1 | Solvent-free liquid copolycarbonate diol based on 1.5 pentanediol and 1,6-hexandiol. Average Mw is 1000, hydroxyl value (mg KOH/g) is 100, and viscosity range at 75° C. is 400-630 centipoise. It is available as ETERNACOLL ™ PH100 brand copolycarbonate diol. ETERNACOLL is a trademark of Ube Industries, Ltd. |

TABLE 2-continued

| Component | Description |
|---|---|
| Polyol 2 | Liquid Novolac polyol based on cashew nutshell liquid technology and having a hydroxyl value of 175 mg KOH/g, a viscosity at 25° C. of 1000 centipoise. It is available as NX-9001LV from Cardolite Corporation. |
| Polyol 3 | A phthalic anhydride-based aromatic polyester polyol having an average molecular weight of 468, equivalent weight of 234, hydroxyl value of 240 mg KOH/g and a viscosity range at 25° C. of 2000-4500 centipoise. It is available as STEPANPOL PS-2412 brand polyol. STEPANPOL is a trademark of Stepan Company. |
| Latent Crosslinker 1 | Hexamethoxymethylmelamine having a viscosity by cone/plate of 2600-5000 centipoise, a specific gravity at 25° C. of 1.20 a refractive index of 1.515-1.520 and free formaldehyde content of 0.5 wt % or less. Trigger temperature for intumescence in a range of 200-220° C. Available as CYMEL ™ 303 crosslinking agent. CYMEL is a trademark of Allnex IP S.A.R. L. Societe A Responsabilite Limitee. |
| Latent Crosslinker 2 | Methylated/n-butylated melamine crosslinker containing a combination of methoxymethyl and n-butyoxymethyl functional sites and having a viscosity at 23° C. of 3000-6000 centipoise, a free aldehyde content of 0.2 wt % or less. Trigger temperature for intumescence in a range of 180-200° C. Available as CYMEL 1130. |
| Latent Crosslinker 3 | Partially hydrolyzed methoxymethyl melamine crosslinker. Trigger temperature for intumescence in a range of 200-220° C. Prepare by placing 3.9 g of a methoxymethyl melamine crosslinker having 3000-6000 centipoise dynamic viscosity at 23° C. and less than 0.25% free formaldehyde (for example, CYMEL 303LF resin) into a 100 milliliter (mL) flask with 10 mL tetrahydrofuran and 0.07 g p-toluenesulfonic acid. Heat to 80° C. Dropwise add a solution of 0.18 g water and 0.07 g paratoluenesulfonic acid. Stir for one hour at 80° C. Remove solvent under vacuum. |
| Expandable Graphite | Expandable graphite flake having a neutral surface, an onset temperature of 160° C. and an average particle size of 350 micrometers. For example, Grafguard ™ 160-50N graphite flake. Grafguard is a trademark of Advanced Energy Technologies LLC. |
| Phosphorous material | Melamine formaldehyde coated ammonium polyphosphate particles. Available as JLS-APP104MF ammonium polyphosphate from Hangzhou JLS Chemical Company, China. |
| Surfactant | Non-hydrolizable silicone copolymer surfactant having a viscosity at 25° C. of 720 centipoise, hydroxyl number of 40 mg KOH/g. Available as NIAX ™ silicone L-6900 copolymer. NIAX is a trademark of Momentive Performance Materials, Inc. |
| Boron-containing material | Zinc borate with an average particle size of 2-3 micrometer and a density of 2.67 grams per cubic meter. |
| Catalyst 1 | Dibutyltin dilaurate |

TABLE 3

| Component | Com Ex C | Ex 1 | Ex 2 | Ex 3 | Ex 4 | Ex 5 |
|---|---|---|---|---|---|---|
| Isocyanate 1 | 17.5 | 13.1 | 13.5 | 17.4 | 15.3 | 13.1 |
| Polyol 1 | 11.7 | 8.7 | 9.0 | 7.8 | 10.2 | 8.5 |
| Polyol 2 | 36.0 | 26.7 | 27.7 | 24.1 | 31.4 | 0 |
| Polyol 3 | 0 | 0 | 0 | 0 | 0 | 8.5 |
| Polyol 4 | 0 | 0 | 0 | 0 | 0 | 14.1 |
| Latent Crosslinker 1 | 0 | 17.1 | 0 | 0 | 20.1 | 19.7 |
| Latent Crosslinker 2 | 0 | 0 | 16.6 | 0 | 0 | 0 |
| Latent Crosslinker 3 | 0 | 0 | 0 | 0 | 0 | 8.5 |
| Boron-containing material | 8.7 | 8.7 | 8.7 | 8.7 | 8.7 | 9.9 |
| Phosphorous Material | 8.7 | 8.7 | 8.7 | 8.7 | 0 | 0 |
| Expandable Graphite | 17.4 | 17.4 | 17.4 | 17.4 | 18.9 | 25.4 |
| Surfactant | 0.1 | 0.1 | 0.1 | 0.1 | 0.1 | 0.1 |
| Catalyst 1 | 0.04 | 0.04 | 0.04 | 0.04 | 0.04 | 0.04 |
| Wt % Latent Crosslinker based on polyol weight | NA | 48 | 45 | 49 | 48 | 63 |

TABLE 4

| Component | Com Ex C | Ex 1 | Ex 2 | Ex 3 | Ex 4 | Ex 5 |
|---|---|---|---|---|---|---|
| Tensile Elongation (%) | 50 | 50 | 50 | 40 | 50 | 40 |
| Water Resistance | 5 | 5 | 5 | 5 | 5 | 5 |
| Expansion Ratio | 30 | 30 | 30 | 30 | 30 | 30 |
| OSB Temp at 15 minutes (° C.) | 150 | 142 | 131 | 130 | 145 | 148 |
| OSB Temp at 30 minutes (° C.) | 360 | 210 | 200 | 200 | 215 | 210 |
| Char Strength | 1 | 3 | 3 | 3 | 3 | 3 |

The invention claimed is:

1. An intumescent coating system comprising:
   (a) a polyol component;
   (b) an isocyanate component;
   (c) a latent crosslinker having two or more —NACH$_2$OR groups, where A is selected from a group consisting of H and —CH$_2$OR, and in each case R is independently selected from a group consisting of hydrocarbons having from one to four carbons, the latent crosslinker being present at a concentration of 30 weight-percent or more based on polyol weight;
   (d) a boron component one weight-percent or more and 10 weight-percent or less based on total weight of the formulation;
   (e) expandable graphite at a concentration of 10 weight-percent or more and 50 weight-percent or less based on the total intumescent system weight;
   where the polyol and isocyanate are selected so that the reaction product at room temperature of the intumescent coating system components produces a coating having a tensile elongation of 40-percent or more as determined according to ISO 37.

2. The intumescent coating system of claim 1, wherein the polyol component is present at a concentration of 60 weight-percent or more based on total weight of polyol and isocyanate-containing component.

3. The intumescent coating system of claim 1, wherein the isocyanate component is selected from a group consisting of methylene diphenyl diisocyanate, polymeric methylene diphenyl diisocyanate, toluene diisocyanate, isophorone diisocyanate, and xylene diisocyanate.

4. The intumescent coating system of claim 1, wherein the latent crosslinker has the following structure:

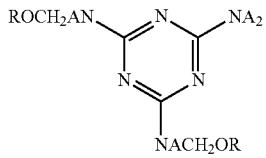

where each A is independently selected from a group consisting of hydrogen and —CH$_2$OR and each R is independently selected from hydrocarbons having from one to four carbons.

5. The intumescent coating system of claim 4, wherein each A is independently an R group.

6. An intumescent coating comprising the reaction product of the intumescent coating system of claim 1.

7. The intumescent coating of claim 6, further characterized by the latent crosslinker being present at a concentration of 20 weight-percent or more based on polyurethane weight.

8. An article comprising:
   a. a substrate; and
   b. the intumescent coating of claim 6 covering at least a portion of the surface of the substrate.

9. The article of claim 8, wherein the substrate comprises at least 75 weight-percent organic material based on total substrate weight.

10. The article of claim 8, wherein the substrate is selected from a group consisting of polymeric foam, wood, and combinations thereof.

* * * * *